M. LINCK.
Vehicle Wheels.

No. 145,219. Patented Dec. 2, 1873.

Witnesses.
E. A. Bates.
George E. Upham.

Inventor.
Martin Linck
Chipman Hosmer & Co
Attys

UNITED STATES PATENT OFFICE.

MARTIN LINCK, OF DANVILLE, ILLINOIS.

IMPROVEMENT IN VEHICLE-WHEELS.

Specification forming part of Letters Patent No. 145,219, dated December 2, 1873; application filed July 19, 1873.

*To all whom it may concern:*

Be it known that I, MARTIN LINCK, of Danville, in the county of Vermilion and State of Illinois, have invented a new and valuable Improvement in Wheels for Vehicles; and I do hereby declare that the following is a full, clear, and exact description of the construction and operation of the same, reference being had to the annexed drawings making a part of this specification, and to the letters and figures of reference marked thereon.

Figure 1:
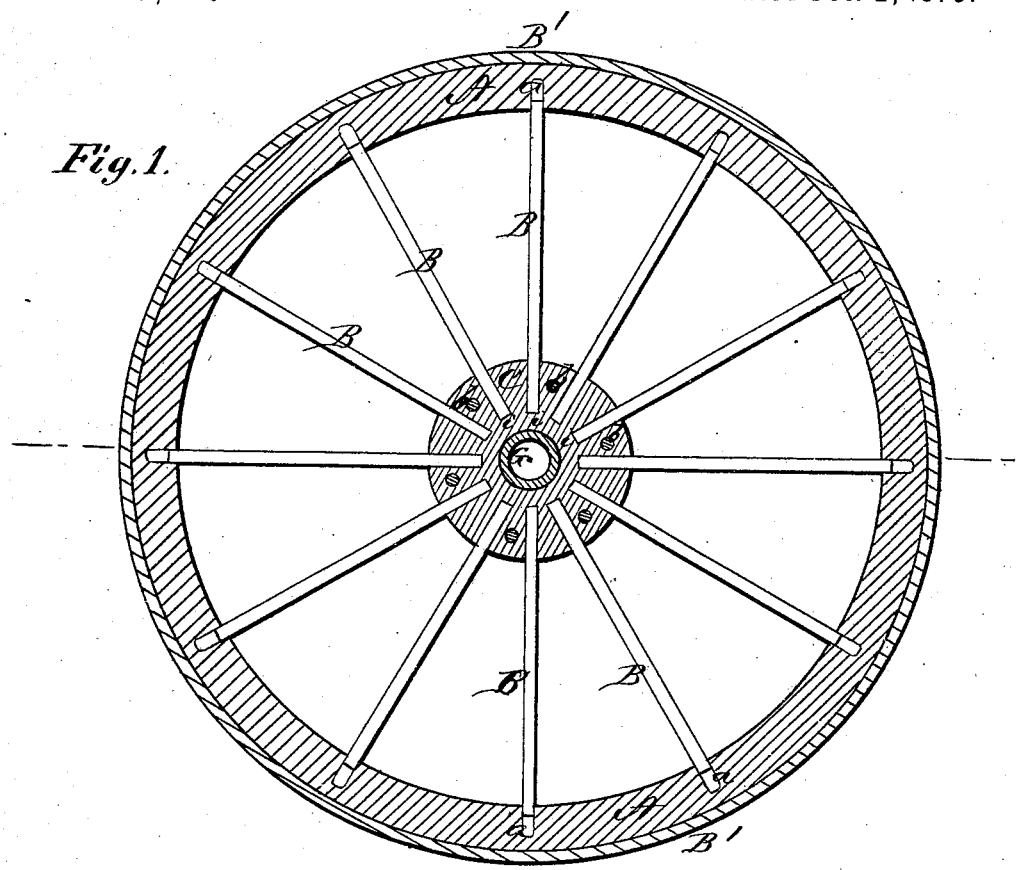
Figure 2:
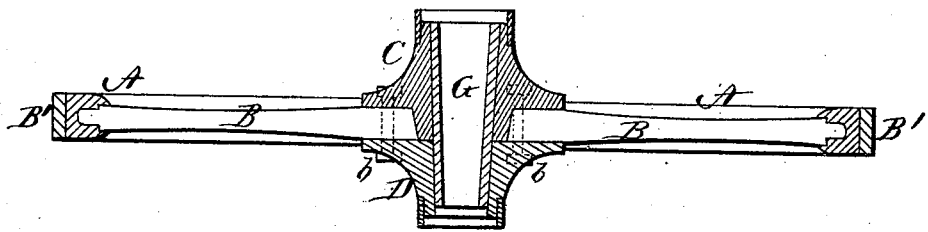

Figure 1 of the drawings is a representation of my wheel in vertical section, and Fig. 2 is a cross-section of the same.

The nature of my invention consists in the construction and novel arrangement of the entire felly, sectional hub-box, and spokes, constituting an iron wheel for vehicles, as will be hereinafter more fully set forth.

In the accompanying drawings, like letters of reference indicate corresponding parts.

A represents the felly of the wheel, made entire, and surrounded by the tire B'. Along the inner edge of the felly A, at regular intervals, are holes or mortises $m$, for the insertion of the tenons at the outer ends of the spokes B B. The hub of the wheel is made in two parts, C and D, fastened together by bolts $b$ $b$. In the main part or body C are recesses $k$, for the reception of the inner ends of the spokes B B, having shoulders $i$ $i$, sloping toward the section D, for the ends of the spokes to rest against. The spokes, each having its tenon inserted in the felly and its butt-end in the recesses $k$, are then held in place by the cap D, this being fastened on with the bolts $b$ $b$ and suitable nuts. The spokes are to be made of gas-pipe, or similar hollow material, and their outer ends turned to fit the holes or mortises $m$ in the felly, the butt-ends being beveled to suit the slope of the recesses $k$, thus making them easily adjustable in place in the wheel. If a spoke is broken, it is only necessary to unscrew the cap D by taking out the bolts $b$ $b$, when the broken spoke can, on account of its sloping end, readily be removed and a new one inserted. Through the hub C D is passed the axle-box G.

As all the parts of this wheel are made of iron, it is strong and durable, and easily and economically manufactured.

What I claim as my invention, and desire to secure by Letters Patent, is—

The within-described wheel for vehicles, consisting of the mortised felly A, of one piece, the tire B', hollow spokes B B, turned at one end and beveled at the other, recessed hub C, with inwardly-sloping shoulders $i$ $i$, hub-cap D, and suitable bolts and nuts, all of said parts being made of iron, and constructed as herein set forth.

In testimony that I claim the above I have hereunto subscribed my name in the presence of two witnesses.

MARTIN LINCK.

Witnesses:
WM. A. YOUNG,
CHARLES HARRIS.